United States Patent
Mittelhauser

(10) Patent No.: US 6,497,835 B1
(45) Date of Patent: Dec. 24, 2002

(54) METHOD OF MAKING A PLASTIC TANK LID FOR A MOTOR VEHICLE

(76) Inventor: Bernhard Mittelhauser, Am Kränenberg Nr. 3, D-30900 Wedemark (DE)

( * ) Notice: Subject to any disclaimer, the term of this patent is extended or adjusted under 35 U.S.C. 154(b) by 0 days.

(21) Appl. No.: 09/376,143

(22) Filed: Aug. 17, 1999

(30) Foreign Application Priority Data

Aug. 17, 1998 (DE) .................................. 198 37 104

(51) Int. Cl.[7] .............................. B29C 33/02; B60J 9/00
(52) U.S. Cl. .................... 264/255; 264/328.8; 428/58; 428/61; 428/68; 428/76; 428/213; 428/215; 428/299.4
(58) Field of Search .............................. 428/58, 61, 68, 428/76, 213, 215, 299.4; 264/255, 328.8; 220/86.2, 817, 818, 836; 296/97.22

(56) References Cited

U.S. PATENT DOCUMENTS 5,814,252 A * 9/1998 Gouldson et al. .......... 264/40.5
6,106,049 A * 8/2000 Cole et al. ................ 296/97.22

* cited by examiner

*Primary Examiner*—Sandra M. Nolan
(74) *Attorney, Agent, or Firm*—R W Becker & Associates; R W Becker

(57) ABSTRACT

A method of producing a tank lid of tough polymeric material, and a tank lid produced according to this method, are provided. The inner side of the tank lid is provided with one or more projections, especially a pivot arm. An inner lid layer is injection molded in a mold together with the projections. Subsequently, in a separate stage, an outer layer that is provided with an outer surface of the lid is injection molded onto the inner layer.

12 Claims, 1 Drawing Sheet

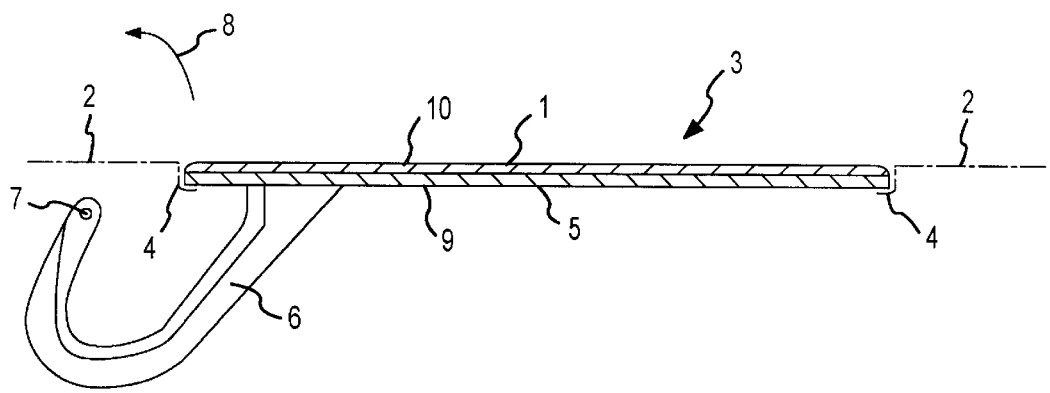

METHOD OF MAKING A PLASTIC TANK LID FOR A MOTOR VEHICLE

BACKGROUND OF THE INVENTION

The present invention relates to a method of producing plastic tank lids for motor vehicles, and the tank lids produced by such a method, wherein the tank lid is made of tough polymeric material, with the inner side of the lid being provided with one or more projections, especially a pivot arm.

Tank lids of the type contemplated by the present invention are intended for covering the access to the fuel filler cap of vehicles, wherein the outer surface of the lid is practically disposed in the plane of the outer surface of the vehicle. The inner side of the cap is provided with one or more projections, especially with an arm that is formed on the inner side and is to be pivotably connected to the vehicle.

It is to be understood that the outer surface of the tank lid must be uniform and regular, for example truely planar or curved, since irregularities of the outer surface are esthetically displeasing and can even be recognized from a distance. However, such irregularities cannot be avoided if, for example, due to contraction processes, indentations or cavities occur after the molding.

It is therefore an object of the present invention to make indentations or cavities practically ineffective during the manufacture of tank lids of the aforementioned general type.

BRIEF DESCRIPTION OF THE DRAWING

This object, and other objects and advantages of the present invention, will appear more clearly from the following specification in conjunction with the accompanying DRAWINGS, the single FIGURE of which is a cross-sectional view of one exemplary embodiment of a tank lid produced according to the inventive process, with the process steps being readily recognized from this FIGURE.

SUMMARY OF THE INVENTION

The objective of the present invention is realized by first molding an inner layer with the projections disposed on the inner side thereof, whereupon an outer layer is injection molded onto this inner layer. As a consequence, the actual body has a two-layer configuration, i.e. is produced in two successive injection processes.

The two layers advantageously have at least essentially the same thickness, whereby a thickness of about 1.5–2 mm is expedient for each layer.

The proposal for making a two-layer tank lid by means of two injection processes also offers a possibility of imparting to the two layers different characteristics, for example with regard to their coloring and their mechanical or chemical properties. For example, the outer layer could be transparent or translucent, and could be colored to correspond to the color of the vehicle. The outer layer could also contain mixtures of foreign substances, such as mineral fibers or the like, in order to impart thereto particular strength characteristics or the like.

Further specific features of the present invention will be described in detail subsequently.

DESCRIPTION OF PREFERRED EMBODIMENTS

Referring now to the drawing in detail, a finished, installed tank lid is illustrated in the closed state. The lid is provided with a lid body 3, the outer surface 1 of which is practically flush with the outer surface 2 of the vehicle. The lid body 3 generally has a round contour, with the edges thereof resting upon stop means 4 of the vehicle. Formed on the underside 5 of the lid body 3 is a curved arm 6 by means of which the lid body 3 is pivotably connected to the vehicle, as indicated by the, reference numeral 7, in order to be able to lift the tank lid open in the direction of the arrow 8 to thereby provide access to the tank connection disposed below the lid body 3.

The tank lid is a unitary molded article that is made of a tough or hard plastic, and in particular by injecting the material into a mold; however, the inventive production is effected in a particular manner by first injecting or forming, in a first injection stage, the layer 9, which is provided with the underside 5, together with the arm 6. In this connection, it should be noted that in the region of the arm 6, in the outer surface of the layer 9, it is quite possible for indentations or cavities, i.e. depressions that result during the contraction process, to occur. After a body comprising the parts 6 and 9 has been produced and cooled, a layer 10 having the outer surface 1, for example utilizing the already used injection mold, although with a different head portion, is applied, i.e. is injected in an amplified mold, upon the layer 9 (the inner layer), and in particular in such a way that the two layers 9, 10 are fixedly interconnected and hence form a unitary sandwich body.

In principle, any desired polymeric material can be used for the layers 9, 10, although these materials must be tough and in terms of strength suitable for the operation of a vehicle. For example, for the outer layer a particularly wear resistant material, for example, a plastic having a polyamide base, can be used. Is also possible to add fibers to the material for the layer 10 in order to influence the strength characteristics. The layer 10 can also be colored throughout to conform to the color of the vehicle, including utilization of a transparent or translucent material, for example on a plexiglas base, that is colored throughout.

It is also possible pursuant to the present invention for the rim of the layer 10 to partially or entirely embrace the rim of the layer 9. As a consequence, it is possible, for example, to achieve a particularly careful coloring of the tank lid since now the edges of the layer 9 that would otherwise be visible on the outside can no longer be seen.

The specification incorporates by reference the disclosure of German priority document 198 37 104.7 of Aug. 17 1998.

The present invention is, of course, in no way restricted to the specific disclosure of the specification and drawings, but also encompasses any modifications within the scope of the appended claims.

What I claim is:

1. A method of producing a tank lid of tough polymeric material, with an inner side of the tank lid being provided with at least one projection, said method including the steps of:

first injection molding, in a mold, an inner lid layer together with said at least one projection; and subsequently, in a separate stage, injection molding onto said inner layer an outer layer that is provided with an outer surface of said lid;

wherein said tank lid comprises a main body, said main body comprising said inner lid layer and said at least one projection, and wherein said outer layer extends completely over the outer surface of said inner lid layer.

2. A method according to claim 1, which includes the step, prior to carrying out said subsequent injection molding step, of at least substantially cooling off the molded element formed by said first injection molding step.

3. A method according to claim 2, wherein said cooling off step comprises cooling off said molded element to room temperature.

4. A method according to claim 1, wherein the molded element of said subsequent injection molding step is fixedly connected to the molded element of said first injection molding step by means of said subsequent injection molding.

5. A method according to claim 1, wherein for carrying out said subsequent injection molding step the molded element formed in said first injection molding step is retained in its portion of said mold.

6. A tank lid produced in accordance with the method of claim 1, wherein said inner layer and said outer layer are comprised of different materials yet are fixedly interconnected.

7. A tank lid produced in accordance with the method of claim 1, wherein said outer layer is appropriately colored to match a color of said vehicle.

8. A tank lid according to claim 7, wherein the basic material for said outer layer is transparent or translucent.

9. A tank lid produced in accordance with the method of claim 1, wherein said outer layer contains fibers mixed therein.

10. A tank lid produced in accordance with the method of claim 1, wherein said layer and said outer layer have substantially the same thickness.

11. A tank lid according to claim 10, wherein said thickness is approximately 1.5–2 mm.

12. A tank lid produced in accordance with the method of claim 1, wherein said outer layer at least partially extends about a rim of said inner layer.

* * * * *